(12) United States Patent
Wingard et al.

(10) Patent No.: US 7,325,221 B1
(45) Date of Patent: Jan. 29, 2008

(54) LOGIC SYSTEM WITH CONFIGURABLE INTERFACE

(75) Inventors: Drew Eric Wingard, San Carlos, CA (US); Michael J. Meyer, Palo Alto, CA (US); Geert P. Rosseel, Menlo Park, CA (US); Lisa Robinson, Boulder Creek, CA (US); Jay Tomlinson, San Jose, CA (US)

(73) Assignee: Sonics, Incorporated, Mountain View, CA (US)

( * ) Notice: Subject to any disclaimer, the term of this patent is extended or adjusted under 35 U.S.C. 154(b) by 24 days.

(21) Appl. No.: 09/634,045

(22) Filed: Aug. 8, 2000

(51) Int. Cl.
*G06F 17/50* (2006.01)
(52) U.S. Cl. .................. 716/17; 716/1; 716/16
(58) Field of Classification Search .................. 716/16, 716/17, 14; 712/43; 365/49
See application file for complete search history.

(56) References Cited

U.S. PATENT DOCUMENTS

| | | | |
|---|---|---|---|
| 5,274,783 A | 12/1993 | House et al. | |
| 5,729,529 A | 3/1998 | Martinsson | |
| 5,748,914 A | 5/1998 | Barth et al. | |
| 5,794,062 A * | 8/1998 | Baxter ......................... | 712/30 |
| 5,845,154 A | 12/1998 | Krakirian | |
| 5,878,045 A | 3/1999 | Timbs | |
| 5,948,089 A | 9/1999 | Wingard et al. | |
| 6,002,692 A | 12/1999 | Wills | |
| 6,005,412 A | 12/1999 | Ranjan et al. | |
| 6,021,450 A | 2/2000 | Yoshizawa et al. | |
| 6,052,773 A * | 4/2000 | DeHon et al. ................. | 712/43 |
| 6,115,823 A | 9/2000 | Velasco et al. | |
| 6,147,890 A * | 11/2000 | Kawana et al. ................ | 365/49 |
| 6,175,886 B1 | 1/2001 | Usami | |
| 6,182,183 B1 | 1/2001 | Wingard et al. | |
| 6,216,259 B1 * | 4/2001 | Guccione et al. ............. | 716/17 |
| 6,298,472 B1 * | 10/2001 | Phillips et al. ................. | 716/18 |
| 6,324,672 B1 * | 11/2001 | Lawman et al. ................ | 716/1 |
| 6,330,225 B1 | 12/2001 | Weber et al. | |
| 6,487,709 B1 * | 11/2002 | Keller et al. ................... | 716/14 |
| 6,493,776 B1 | 12/2002 | Courtright et al. | |

(Continued)

FOREIGN PATENT DOCUMENTS

WO    WO 00/22553    4/2000

(Continued)

OTHER PUBLICATIONS

O. Mencer, PAM-Blox II: Design and Evaluation of C++ Module Generation for Computing With FPGAs, IEEE Symposium on Field-Programmable Custom Computing Machines, pp. 67-76, Apr. 2002.*

(Continued)

*Primary Examiner*—Leigh M. Garbowski
(74) *Attorney, Agent, or Firm*—Rutan & Tucker, LLP (57) ABSTRACT

A core block with a highly configurable interface such that the interface of the core can be optimally configured for the system the core is integrated into. In one embodiment the method consists of defining a configurable interface with different configuration options, capturing the specific core configuration through manual entry or through the use of a Graphical User Interface, and providing for software that combines the source description of the core with the configuration data to generate the core with an optimally configured logic and circuit interface.

11 Claims, 7 Drawing Sheets

U.S. PATENT DOCUMENTS

| | | | |
|---|---|---|---|
| 6,510,546 B1 * | 1/2003 | Blodget | 716/16 |
| 6,578,117 B2 | 6/2003 | Weber | |
| 6,725,313 B1 | 4/2004 | Wingard | |
| 2003/0074520 A1 | 4/2003 | Weber | |

FOREIGN PATENT DOCUMENTS

| WO | WO 00/29961 | 5/2000 |
|---|---|---|

OTHER PUBLICATIONS

Wayne Luk et al., Modelling and Optimising Run-Time Reconfigurable Systems, Proceedings of the IEEE Symposium on FPGAs for Custom Computing Machines, pp. 167-176, Apr. 1996.*

R. Bergamaschi et al., Designing Systems-on-Chip Using Cores, Proceedings of the 37th Conference of Design Automation, pp. 420-426, Jun. 2000.*

K. Compton et al., Reconfigurable Computing: A Survey of Systems and Software, ACM Computing Surveys, pp. 171-210, Jun. 2002.*

John D. Spragins et al., "Telecommunications Protocols and Design", (ISBN: 0-21-09290-5, Jul. 1992), pp. 18 total.

Supplementary Partial European Search Report, EP 01962072.3-2201, dated Dec. 22, 2005 (4 pages).

"Enabling Reuse via an IP Core-centric Communications Protocol: Open Core Protocol™", Sonics Inc IP 2000, no page numbers.

"Effective Memory Interfacing for System-on-Chip Designs", Intellectual Property World Forum, 1999, pp. 121-135.

Wolf-Dietrich Weber, "Enabling Reuse via an IP Core-centric Communications Protocol: Open Core Protocol™", Sonics Inc. 2000, 4 pages.

Drew Wingard and Alex Kurosawa, "Integration Architecture for System-on-a-Chip Design", IEEE 1998 Custom Integrated Circuits Conference, pp. 85-88.

Supplementary European Search Report for Application No.: 01962072.3-2224, PCT/US0125123, Date of completion of Search: Feb. 21, 2006, mailed Mar. 13, 2006, pp. 6 total.

Andy Elms, "Tunning a Customisable RISC core for DSP", Electronic Product Design, Sep. 1997, pp. 19-21.

* cited by examiner

Figure 1a: Initial core (Prior Art)

Figure 1b: Core with re-designed Interface (Prior Art)

Figure 1c: Core of 1.a with external interface logic (Prior Art)

Figure 2a:

| Name | Signal width | Function |
| --- | --- | --- |
| Clk | 1 | Clock |
| MCmd | 2 | Command |
| MAddress | 32 | Address |
| Mdata | 64 | Write Data |
| SCmdAccept | 1 | Accept Command |
| SResp | 2 | Response |
| SData | 64 | Read Data |

| Command encoding | Function |
| --- | --- |
| 00 | Idle command |
| 01 | Read Command |
| 10 | Write Command |
| 11 | Exclusive Read Command |

Figure 3b:

| Burst encoding | Burst Function |
| --- | --- |
| 000 | Incrementing burst with burst length of 1 |
| 001 | Incrementing burst with burst length of 2 |
| 010 | Incrementing burst with burst length of 4 |
| 011 | Incrementing burst with burst length of 8 |
| 100 | Non-Incrementing burst |

Figure 4:

| Signal Name | Width | Parametrization | Signal Enabling | Function |
|---|---|---|---|---|
| Clk | 1 | N | N | Clock |
| Reset | 1 | N | Y | Reset |
| MCmd | 2 | N | N | Request Command |
| MAddr | 1-32 | Y | N | Request Address |
| MData | 8:16:32:64 | Y | N | Request Write Data |
| MBurst | 3 | N | Y | Request Burst |
| MByteEn | 1:2:4:8 | Y | Y | Request Byte Enable |
| MDataValid | 1 | N | Y | Write Data Valid |
| SCmdAccept | 1 | N | N | Accept Command |
| SDataAccept | 1 | N | With MDataValid | Accept Write Data |
| SResp | 2 | N | N | Response |
| SData | 8:16:32:64 | Y | N | Read Response Data |
| MFlag | 1:8 | Y | Y | Master Out of Band signal |
| SFlag | 1:8 | Y | Y | Slave Out of Band Signal |
| MError | 1 | N | Y | Master Error |
| SError | 1 | N | Y | Slave Error |

Figure 5:

| | |
|---|---|
| MData_WIDTH | 16 |
| MAddr_WIDTH | 32 |
| MBurst_ENABLE | 1 |
| MByteEn_ENABLE | 1 |
| MByteEn_WIDTH | 4 |
| MDataValid_ENABLE | 0 |
| MFlag_ENABLE | 1 |
| MFlag_WIDTH | 2 |
| SFlag_ENABLE | 0 |
| MError_ENABLE | 1 |
| SError_ENABLE | 0 |

LOGIC SYSTEM WITH CONFIGURABLE INTERFACE

BACKGROUND OF THE INVENTION

1. Field of the Invention

The present invention relates to a configurable interface enabling straightforward re-use of a core with different interfaces.

2. Art Background

The latest advances in semiconductor technology and design methodology have enabled the emerging market for System-On-a-Chip (SoC) designs. Full systems, consisting of more than several million logic gates, can now be implemented in a single chip. One of the main design challenges in these SoC designs is the logical and physical interconnect that allows communication between the subsystem cores that compose the design. These cores typically fall into different categories: computing cores such as a CPU (central processing unit), DSP (digital signal processor) or floating point co-processor; peripheral interface cores such as PCI (personal computer interface) or USB (universal serial bus); memory blocks such as SRAM (static random access memory) and on-chip DRAM (dynamic random access memory); and application specific blocks such as video cores (MPEG-motion pictures experts group) or communication cores.

Since many of the SoC designs are targeted towards communications and consumer applications, time-to-market is a critical factor in the decision process on the level of integration to be used in a particular product. Once a core has been proven in one design, it becomes very attractive to re-use the core in later designs. While choosing a proven design may eliminate the time that would otherwise be required to design a new core, design re-use offers the promise of many other benefits. First, a model may be written for the proven core that can provide accurate results when analyzing the requirements and performance of a new system design; the model for a new, unproven core is likely to be neither as accurate as the proven core, nor built in time to influence the design. Second, proven cores can serve as building blocks that simplify the overall design process by allowing the system designer to focus at a higher level of abstraction, while providing improved predictability in the resulting system implementation. Third, re-use of hardware cores protects the investment in software to control those cores, and allows the system software implementation to proceed as soon as the hardware building blocks have been chosen. Finally, core re-use protects the investment in verification and testing. Since the desired systems are highly integrated, the required cores end up deeply embedded within an integrated circuit. In deeply-embedded designs, verifying the design functionality becomes very challenging and testing an individual system to prove that it is correctly built can lead to expensive delays or costly system rework. Thus, maintaining the integrity of core verification and testing is likely the single biggest gain from design re-use.

However, historically, re-using cores has not been efficient. One of the challenges in the re-use of these cores is that, dependent on the system requirements of the SoC that the core is used in, different performance levels and features are required from the core. Moreover, many applications of SoC are targeted towards consumer applications where providing the most cost-effective solution is very important.

Figure 1A:
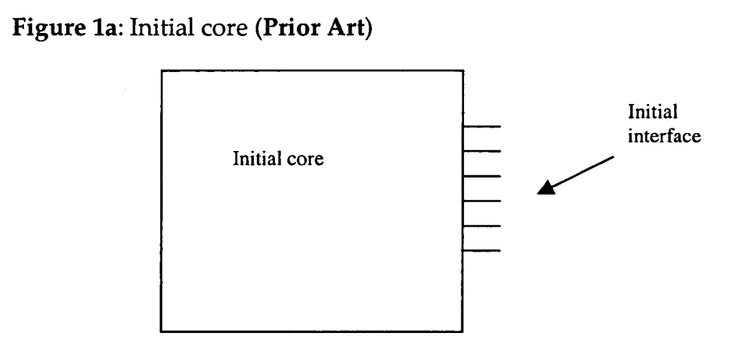
FIGS. 1a, 1b, and 1c illustrate prior art techniques relating to core interfacing.

The interface of the core has been a source of inefficiency in core re-use. FIG. 1a shows a representation of a core with a particular interface. Inefficiencies arise when this core must be re-used in a different system that requires a different interface of the core, or demands different requirements of the core.

Figure 1B:
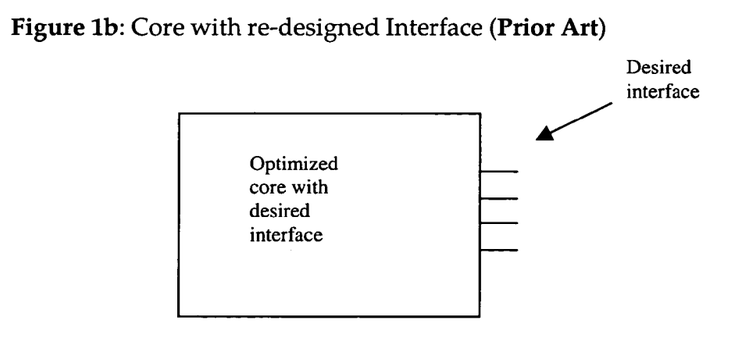

One option is to re-design the interface of the core. This solution may offer area and performance benefits, but is expensive in term of time, effort and design risk. The effort involved is not only in terms of design time but there is also significant additional work in verification and validation. This solution is represented in FIG. 1b, which shows the core with the optimized interface.

Figure 1C:
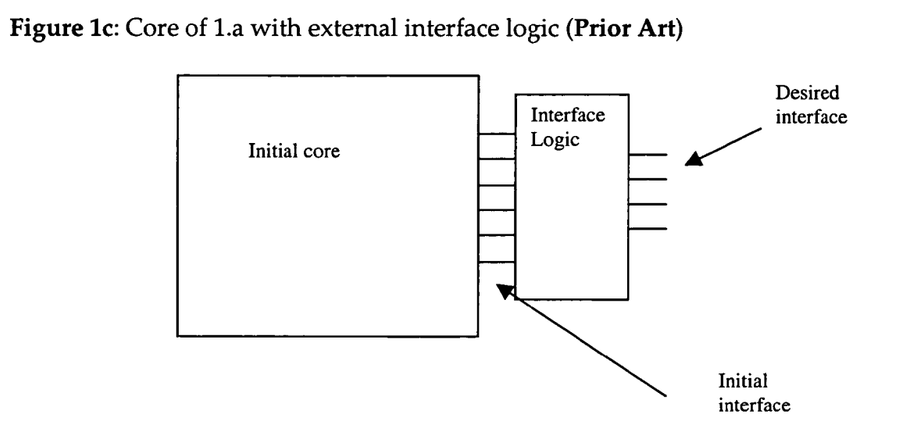

Rather than changing the core, some designers opt to leave the core as is, and adapt the system level interconnect to the existing core interface. While it preserves the integrity of the original core, it leads to many other inefficiencies. With respect to performance, the logic that integrates the core into the system can add latency into the system, which can adversely affect the system performance. With respect to cost, the additional logic can add a significant number of gates to the design and hence increase the chip area and hence the cost. This solution is represented in FIG. 1c.

SUMMARY

The system and method of the present invention provides a core or subsystem with a configurable interface that enables straightforward re-use of the core. In one embodiment, code representative of the core and configurable interface parameters are combined with input consisting of the defined configurable interface parameters to generate a core having an interface configured in accordance with the defined interface parameters.

BRIEF DESCRIPTION OF THE DRAWINGS

The objects, features and advantages of the present invention will be apparent from the following detailed description in which.

DETAILED DESCRIPTION

In the system and the method of the present invention, the above challenges of creating optimal cores for a particular system are resolved by implementing a core with a highly configurable interface, such that the core together with its interface can be optimally configured for the particular system that the core is used in. In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

Figure 2A:
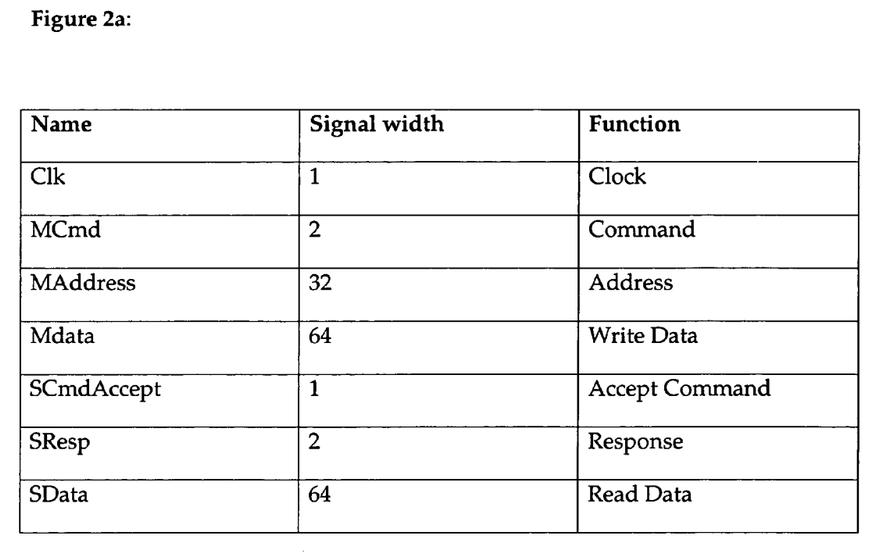
FIGS. 2a and 2b illustrate one embodiment of a logic interface.
Figure 2B:
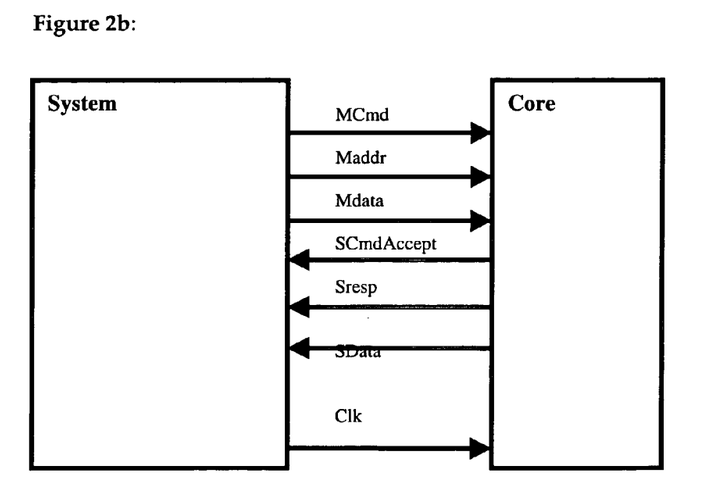

The system and the method of the present invention will be explained by example, initially referring to FIG. 2a. FIG. 2a shows exemplary signals of a simple logical interface. The signals include a request phase that includes command, address, data and command accept, and a response phase that includes response and data. FIG. 2b illustrates an interface providing the connection between two cores. For purposes of discussion herein cores are defined as logic or circuitry that performs a function or functions that receives input and/or generates output at least in part through a configurable interface.

Figure 3A:
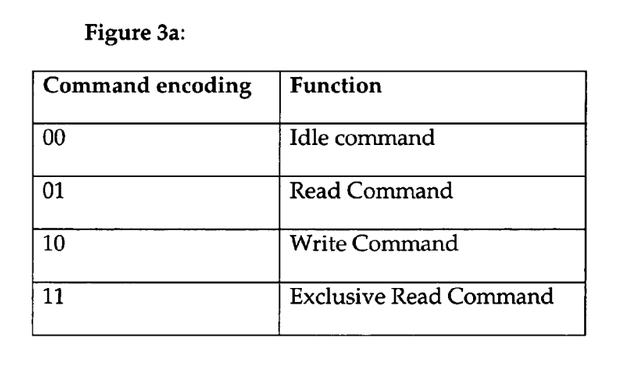
FIGS. 3a and 3b illustrate embodiments of configurable interface parameters.

In one embodiment, the function to be performed can be specified by the MCmd lines of FIG. 2b. One embodiment of the MCmd encoding specifies read, write and exclusive read functions, as shown in FIG. 3a. Such functions may represent typical operations performed in computer systems. For instance the exclusive read may indicate that a read to a specific address must be followed by a write to the same address before any other core in the system can read that location.

In one embodiment, the command encoding can be as given in FIG. 3a. The encoded functions are functions that are typically used in computer systems. Exclusive Read indicates that a read to a specific address must be followed by a write to the same address before any other core in the system can write that location.

The above interface illustrated by FIGS. 2a and 2b and 3a is a simple interface and can be used when the core only needs to support low-performance requirements from the system. One can now extend the interface to incorporate additional functional and performance related features in a configurable manner such that the core support many different combinations on interface options. In alternate embodiments, fewer or additional types of configurability may be implemented. In one embodiment herein, there are three different types of configurability.

In an exemplary type of configuration, one can configure the width of a particular field. As an example, the width of the address field can be configured to be a value between 1 and 32 lines. This allows the core to be used in systems that require different sizes of address space. This type of configurability is referred to herein as "parametrization".

In an exemplary second type of configuration, one can select the availability of certain interface functions. In the command-encoding example of FIG. 3a, one can make the function "Exclusive Read" a configurable option, such that this function can be enabled when the core is used in a system that requires this. This type of configurability is referred to herein as "function enabling".

Figure 3B:
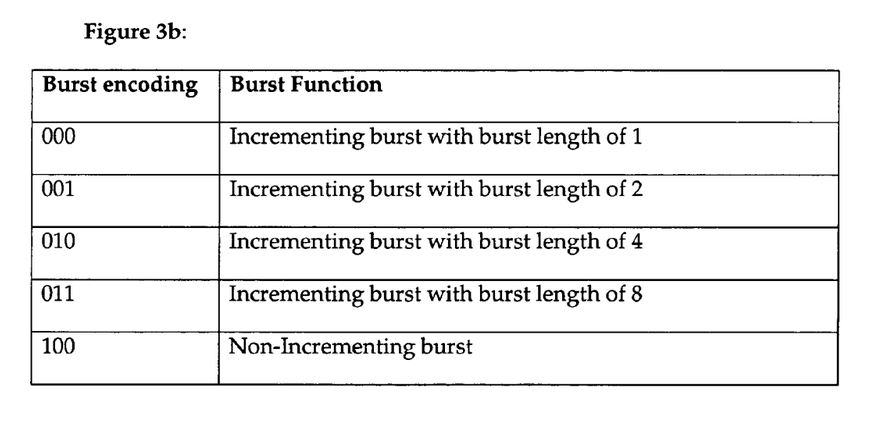

In an exemplary third type of configuration, a signal can be configured to be present or not. This type of configurability is referred to herein as "signal-enabling". FIG. 2b represents a very simple logical interface, which can be used for cores with low performance requirements. A higher level of interface functionality and complexity may include the addition of a burst field (Mburst), indicating that the addresses of subsequent commands are logically related. One embodiment of the burst encoding of the Mburst signal is shown in FIG. 3b. As indicated herein, an incrementing burst indicates a command sequence where the address increments by the number of bytes in the data word with every new command being issued in the burst. A non-incrementing burst is a burst sequence where the address remains unchanged between the commands in the burst. A core with burst configured in potentially allows much higher read and write throughput for transferring a large block of data. Again, this option can be optionally configured into the core interface if the core is used in a system that can take advantage of this feature.

The greater the configurability of the interface, the wider the usability of the core. One embodiment of an extended and highly configurable core interface is shown in FIG. 4.

Figure 4:
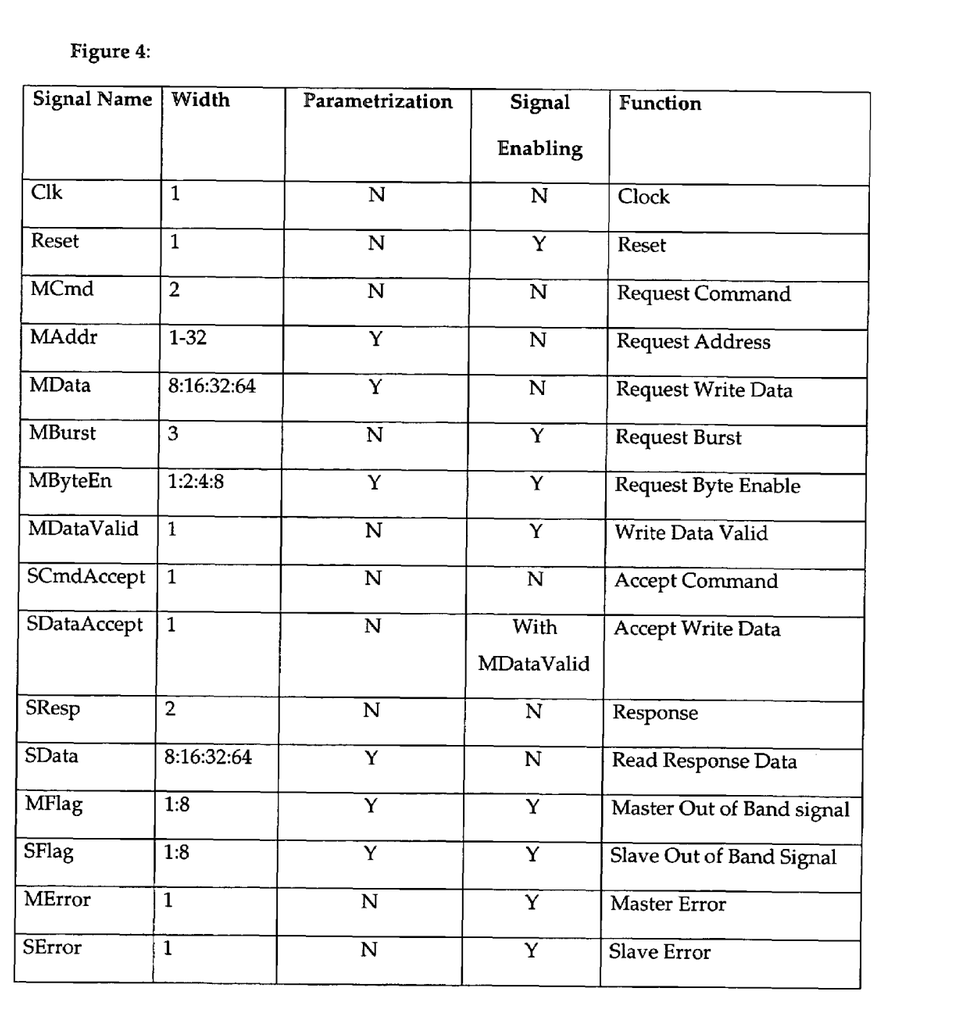
FIG. 4 illustrates one embodiment of an interface generated in accordance with the teachings of the present invention.

Some of the extensions illustrated by FIG. 4 include the ByteEnable Field (MByteEn) indicates which bytes in the MData Field are to be read or written; MError and SError that represent error signals; and MFlag and SFlag fields that are used for transferring out-of-band information between the core and the system. A traditional and well-known example of this kind of information is synchronization, where for example, the system is waiting for an out-of-band signal from the core before the system transmits any further requests.

Figure 6:
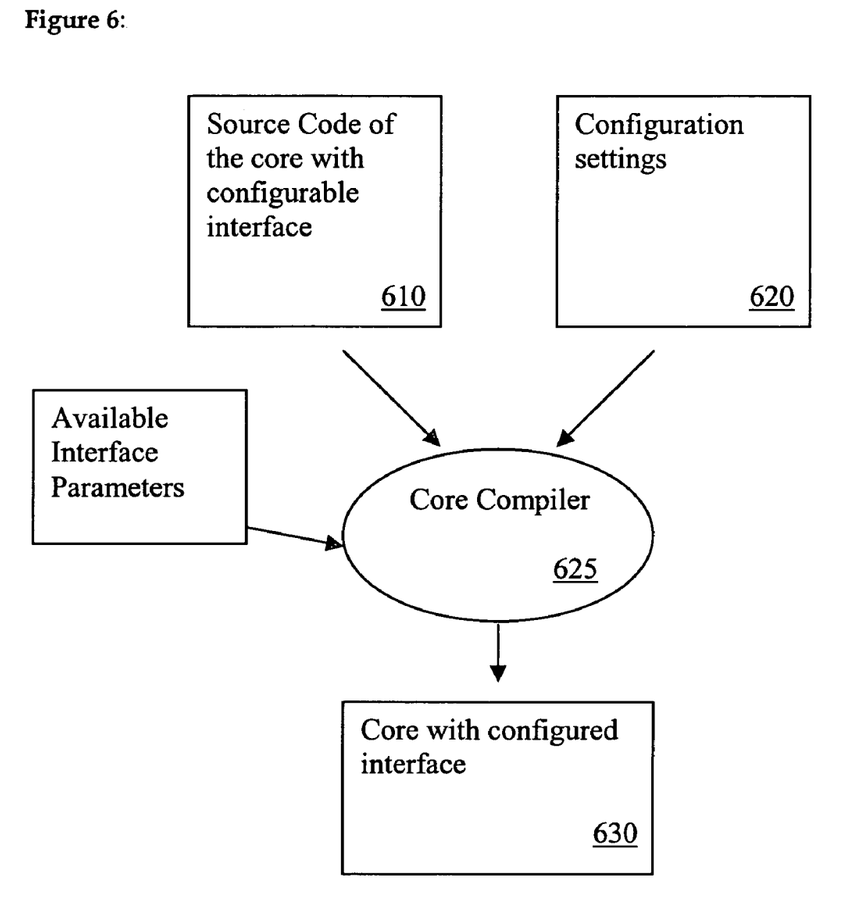
FIG. 6 illustrates one embodiment of a process for generating a core using a previously configured interface.

One embodiment of a method of generating the optimal core is illustrated in FIG. 6. At step 610, the core source code with at least one configurable interface parameter is provided. In one embodiment, for each interface configuration option, a parameter is defined, together with a range of allowable values. For example, for configuring the width the MData field of FIG. 4, the parameter name MData_WIDTH is defined and the allowable values are 8, 16, 32 and 64. For signal-enabling the MBurst field, the parameter MBurst_ENABLE can be defined with the allowable values of 0 and 1, where the value 0 indicates that it is not present and the value of 1 indicates that it is.

In one embodiment, the core is implemented as configurable source code that makes use of these parameters or derived versions of these parameters. This source code can be in a variety of forms of e.g. commercially available hardware description languages (Verilog, VHDL) or software languages (C, perl, . . . ), or any combination of these or any other language.

Figure 5:
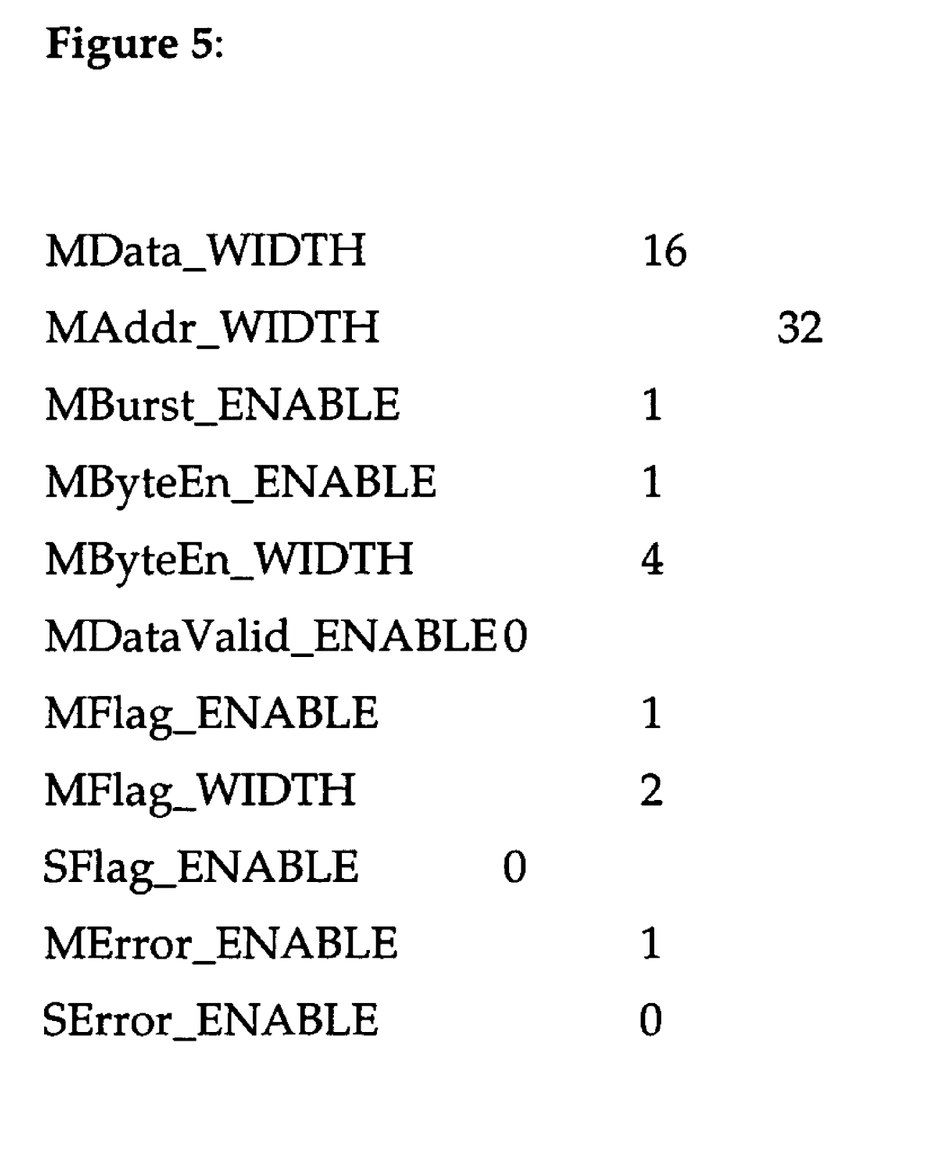
FIG. 5 is an example of a configuration file.

At step 620, the configuration settings are provided. In one embodiment, the configuration settings are defined in a machine-readable form. In one embodiment, the configuration settings for a particular core are defined in a file. FIG. 5 shows an example of a configuration file describing a particular configuration of the interface described in FIG. 4.

At step 625, the source code and configurations settings are combined, e.g., compiled, to generate the core with the configured interface. In one embodiment, a software program, referred to herein as the core compiler, process, step 625, the configurable source code representation of the core is combined with the data of the configuration to generate a core with the desired interface, step 630.

Figure 7:
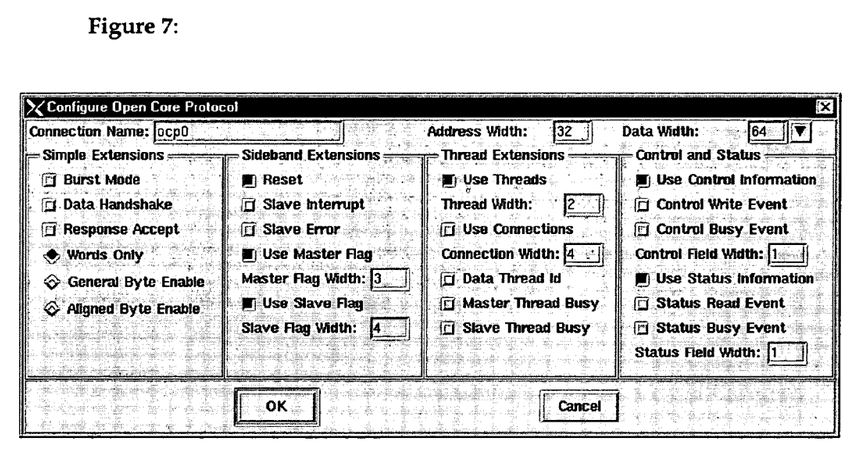
FIG. 7 is an example of a graphical user interface utilized in one embodiment to select a configuration of the interface.

In one embodiment, the configuration settings can be entered manually by the user; alternatively the settings can be entered through a Graphical User Interface. FIG. 7 illustrates one embodiment of an example Graphical User Interface for configuring a set of options on a core with a configurable interface similar to the one described in FIG. 4. These values, which are described by the text in the GUI window, are used by software, together with the configurable source code, to derive the core with the desired interface.

The invention has been described in conjunction with the preferred embodiment. It is evident that numerous alternatives, modifications, variations and uses will be apparent to those skilled in the art in light of the foregoing description.

What is claimed is:

1. A new computer core having an interface to communicate with other cores, wherein the interface contains a plurality of interface signal carriers that are configurable, at compilation, such that at least one of the interface signal carriers is selectively physically present in the interface or not physically present, wherein not physically present means that a route connection is not generated for an interface signal carrier selected to be not physically present.

2. The computer core as set forth in claim 1, wherein the computer core is a core on a system on a chip and the other cores also belong to that system on a chip.

3. The computer core as set forth in claim 1, wherein a first interface signal carrier is further configured to support different levels of functionality for the interface.

4. The computer core as set forth in claim 3, wherein a signal carrier width of the first interface signal carrier is also configurable to support different signal widths.

5. A core on a system on a chip having an interface, wherein the interface contains a plurality of interface signal carriers that are configurable, at compilation, such that a first interface signal carrier of the plurality of interface signal carriers is configurable to support different levels of functionality for the interface.

6. The core as set forth in claim 5, wherein a signal carrier width of the first interface signal carrier is also configurable to support different signal widths.

7. The core as set forth in claim 5, wherein the first interface signal carrier is configurable, at compilation, such that the first interface signal carrier is selectively physically present in the interface or not physically present.

8. A method for generating at compilation a core interface for a system on a chip to enable re-use of the core with a different interface configuration, the method comprising:
    providing configurable source code representative of the core interface for the system on a chip and identifying parameters of the core interface;
    defining configuration parameters of the core interface; and
    generating the core interface for the system on a chip from the configurable source code representative of the core interface and the identified parameters of the core interface configurable in accordance with the defined configuration parameters of the core interface.

9. The method as set forth in claim 8, wherein at least one of the configuration parameters of the core interface is defining whether a first interface signal carrier will be physically present in the core interface or not physically present.

10. The method as set forth in claim 8, wherein at least one of the configuration parameters of the core interface is defining different levels of functionality that the core interface supports through a plurality of signal interface carriers.

11. The method as set forth in claim 8, wherein at least one of the configuration parameters of the core interface is defining a signal width of a first interface signal carrier.

* * * * *